US009012695B2

(12) United States Patent
De Mars et al.

(10) Patent No.: US 9,012,695 B2
(45) Date of Patent: Apr. 21, 2015

(54) PROCESS FOR NEUTRALIZING AN UNNEUTRALISED POLYETHER POLYOL

(75) Inventors: Sylvie De Mars, Meise (BE); Joris Karel Peter Bosman, Herselt (BE)

(73) Assignee: Huntsman International LLC, The Woodlands, TX (US)

( * ) Notice: Subject to any disclaimer, the term of this patent is extended or adjusted under 35 U.S.C. 154(b) by 509 days.

(21) Appl. No.: 13/376,635

(22) PCT Filed: May 18, 2010

(86) PCT No.: PCT/EP2010/056766
§ 371 (c)(1),
(2), (4) Date: Dec. 7, 2011

(87) PCT Pub. No.: WO2010/145899
PCT Pub. Date: Dec. 23, 2010

(65) Prior Publication Data
US 2012/0078018 A1 Mar. 29, 2012

(30) Foreign Application Priority Data
Jun. 18, 2009 (EP) .................................... 09163124

(51) Int. Cl.
C07C 41/18 (2006.01)
C08G 65/30 (2006.01)

(52) U.S. Cl.
CPC ..................... *C08G 65/30* (2013.01)

(58) Field of Classification Search
CPC ...................................... C08G 65/30
USPC ........................................ 568/621
See application file for complete search history.

(56) References Cited

U.S. PATENT DOCUMENTS

| 3,341,599 | A | * | 9/1967 | Bormann et al. ............. 564/497 |
| 4,306,943 | A | * | 12/1981 | Mori et al. ..................... 203/29 |
| 6,504,062 | B2 | | 1/2003 | Brons et al. |
| 2009/0143625 | A1 | * | 6/2009 | Hasselaar et al. ............. 568/679 |

FOREIGN PATENT DOCUMENTS

| DE | 1 495 729 | | 8/1969 |
| EP | 0 050 181 | | 4/1982 |
| EP | 1 062 263 | A | 12/2000 |
| EP | 2 028 211 | | 2/2009 |

OTHER PUBLICATIONS

International Search Report and Written Opinion regarding corresponding application No. PCT/EP2010/056766, dated Jul. 29, 2010.

* cited by examiner

*Primary Examiner* — Rosalynd Keys
(74) *Attorney, Agent, or Firm* — Robert A. Diaz

(57) ABSTRACT

A process for neutralizing an unneutralized polyether polyol prepared using a base catalyst according to the invention comprises the steps of addition of a polyprotic acid to the unneutralized polyether polyol, the highest pKa-value of the polyprotic acid being less than 3.5, wherein, per kilogram of unneutralized polyether polyol, "A" moles of said polyprotic acid are added to the unneutralized polyether polyol, such that $(n-1)*A<B<n*A$, wherein ■ B being the moles of protons necessary to completely neutralize a kilogram of unneutralized polyether polyol; ■ n being the number of protons which said polyprotic acid can donate; removing water from said neutralized polyether polyol at a temperature between 100 deg C. and 160 deg C., providing dewatered neutralized polyether polyol with a water content of less than 1% w based upon the weight of the dewatered neutralized polyether polyol; removing the crystals formed during the steps of addition of acid and removal of water from the neutralized polyether polyol.

20 Claims, No Drawings

PROCESS FOR NEUTRALIZING AN UNNEUTRALISED POLYETHER POLYOL

This application is the National Phase of International Application PCT/EP2010/056766 filed May 18, 2010 which designated the U.S. and which claims priority to Foreign Application No. 09163124.2 filed Jun. 18, 2009. The noted applications are incorporated herein by reference.

The present invention relates to processes for neutralizing an unneutralised polyether polyol prepared using a base catalyst.

Methods for preparing polyether polyols, also sometimes referred to as poly (alkylene oxide) polyols, typically involve reacting a starting compound having a plurality of active hydrogen atoms with one or more alkylene oxides in presence of a base catalyst, preferably a strong base such as potassium hydroxide. Suitable starting compounds are a.o. polyfunctional alcohols, typically comprising 2 to 6 hydroxyl groups. Examples of such alcohols are glycol, e.g. diethylene glycol, dipropylene glycol, glycerol, di-and polyglycerols, pentaerythritol, trimethylolpropane, triethanolamine, sorbitol, mannitol, etc. Alkylene oxides used are typically ethylene oxide, propylene oxide, butylene oxide or mixtures of two or more of these.

After the addition of the alkylene oxides to the starting material, a crude, basic polyether polyol is obtained, which needs neutralization of the base catalyst.

After neutralization, several steps to work-up the neutralised polyether polyol are required to provide a polyether polyol meeting the specifications for further use of the polyether polyol. The polyether polyol may e.g. be used as a raw material in polyurethane production, where the polyol is, in general, reacted with a polyisocyanate component, such as methylene diphenyl diisocyanate (MDI) or toluene diisocyanate (TDI).

The disadvantage of the processes of prior art is that some steps are difficult to perform to provide the polyol meeting the specifications for further use. E.g. the neutralization causes crystallization of salt, which in prior art processes, has a considerable variation in particle size. This causes the removal of the particles, e.g. by filtration, to become difficult.

A further disadvantage of polyether polyols is the possibility that odorous contaminants or odor precursors, obtained during the oxyalkylation, may remain present in the polyether polyol. EP1062263A1 teaches a process for neutralization polyether polyols, which process removes some of the odorous components. The process has the disadvantage that added acid has to be neutralised on its turn again, thereby providing a complicated process.

EP2028211A1 discloses the addition of $H_2SO_4$ at high volumes, resulting in either acid polyether polyols or in the necessity to add base to neutralise the excess of acid added.

DE1495729 discloses the provision of polyether polyols wherein the addition of a filter aid is necessary to obtain filtered polyether polyol.

EP50181A1 discloses the addition of a hydrate of a metal salt of $H_2SO_4$ to promote crystal growth of a salt formed from $H_2SO_4$ and potassium hydroxide.

It is an object of the present invention to provide a process for neutralizing polyether polyols, which may avoid addition of a base to the neutralised polyol to bring the polyol in the specifications for its Av (acid value). It is also an object of the present invention to provide a process for neutralizing polyether polyols, which facilitates easy removal of the salt obtained by neutralization.

According to a first aspect of the present invention, a process for neutralizing an unneutralised polyether polyol prepared using a base catalyst is provided. The process comprises the steps of addition of a polyprotic acid to the unneutralised polyether polyol, the highest pKa-value of the polyprotic acid being less than 3.5, wherein, per kilogram of unneutralised polyether polyol, "A" moles of said polyprotic acid are added to the unneutralised polyether polyol, such that $(n-1)*A<B<n*A$, wherein B being the moles of protons necessary to completely neutralize a kilogram of unneutralised polyether polyol;
n being the number of protons which said polyprotic acid can donate;
removing water from said neutralised polyether polyol at a temperature between 100 deg C. and 160 deg C., providing dewatered neutralised polyether polyol with a water content of less than 1% w based upon the weight of the dewatered neutralised polyether polyol;
removing the crystals formed during the steps of addition of acid and removal of water from the neutralised polyether polyol.

Preferably, the highest pKa-value of the polyprotic acid being less than 3.

The addition of this amount of polyprotic acid causes the unneutralised polyether polyol to become fully neutralised. The resulting polyether polyol after addition of the polyprotic acid according to the invention will be slightly above neutral, i.e. slightly acidic.

According to some embodiments of the present invention, the amount of polyprotic acid added to the unneutralised polyether polyol provided may be such that after complete neutralization, an excess of less than 0.0018 mole of protons (H+) per kilogram neutralised polyol is provided.

The amounts or moles of protons per kilogram neutralised polyol are measured according to ASTM D1639.

Preferably, the amount of polyprotic acid added to the unneutralised polyether polyol provides less than 0.0009 moles of protons per kilogram neutralised polyether polyol, or even less than 0.0002 mole of protons (H+) per kilogram neutralised polyol. The moles of protons per kilogram is typically more than 0, such as more than 0.00001.

Water may be added to the polyol, either before or simultaneously with the polyprotic acid, or after the acid has been added.

Preferably the acid may be diluted with additional water prior to addition of the acid and water to the unneutralised polyether polyol.

Methods for preparing polyether polyols, of which the process according to the present invention may be part of, may comprise the step of reacting a starting compound having a plurality of active hydrogen atoms with one or more alkylene oxides in presence of a base catalyst, preferably a strong base such as potassium hydroxide or cesium hydroxide. Suitable starting compounds are a.o. polyfunctional alcohols, typically comprising 2 to 8 hydroxyl groups. Examples of such alcohols are—water, ethyleneglycol, diethylene glycol, dipropylene glycol, glycerol, pentaerythritol, trimethylolpropane, monoethanolamine, diethanolamine, triethanolamine, sorbitol, sucrose, ethylenediamine, diethylenetriamine, toluenediamine, polymeric DADPM, etc. Alkylene oxides used are typically ethylene oxide, propylene oxide, butylene oxide or mixtures of two or more of these.

After the addition of the alkylene oxides to the starting material, a crude, basic polyether polyol is obtained, which needs neutralization of the base catalyst.

The term "unneutralised polyether polyol" is to be understood as polyether polyol in which the base catalyst has not or only partially been neutralised using an acid. Hence it might indicate either the crude polyether polyol as it leaves the reactor in which the alkylene oxides are reacted with the starting compound, or the resulting mixture obtained by partially neutralizing the crude polyether polyol.

Polyprotic acids are able to donate more than one proton per acid molecule. For each proton the polyprotic acid can donate, the acid is characterized by a dissociation constant pKa.

According to some embodiments of the present invention, the polyprotic acid may be $H_2SO_4$.

The most preferred polyprotic acid is the diprotic acid $H_2SO_4$, its pKa's being −3 and 1.99. The acid may be added to the unneutralised polyether polyol as a solution of $H_2SO_4$ in water.

The addition of the polyprotic acid is preferably done when the temperature of the polyol may be in the range of 70-150° C.

According to some embodiments of the present invention, removing water from said neutralised polyether polyol may be done at a temperature between 100 deg C. and 160 deg C., typically between 110 deg C. and 145 deg C., e.g. at 120 deg C. or 140 deg C.

The water may be removed by evacuation of the water vapour produced, e.g. by removing the vapour, comprising the water vapour, above the liquid neutralised polyether polyol after addition of the acid. Optionally the pressure may be reduced to less than the ambient pressure to remove additional water from the neutralised polyether polyol. A water content of less than 1% w, even less than 0.5% w or less than 0.1% w may be obtained.

According to some embodiments of the present invention, removing water from said neutralised polyether polyol may provide dewatered neutralised polyether polyol with a water content of less than 0.5% w, or even less than 0.1% w, % w based upon the weight of the dewatered neutralised polyether polyol.

According to some embodiments of the present invention, removing the crystals formed during the steps of addition of acid and removal of water from the neutralised polyether polyol may be done by filtration or by centrifugation.

It was found that, after adding the acid as set out above, and removal of the water at the temperatures mentioned above, the neutralization of the base catalyst with the acid causes crystals to grow, which crystals have dimensions (such as particle size and particle size distribution) which are more easily removable using industrially applicable filtration installations or centrifuges. Volume % based particle size distributions with maximum peak in the range of 100 to 200 μm (microns) may be obtained.

It was found that removal of the water at lower temperatures, result in more particles having smaller particle sizes, being less easily removable from the dewatered polyether polyol.

Using the water removal in a temperature range as set out above also has the advantage that the polyether polyol can be dewatered faster and to a further extent in economically viable way. It was noticed that faster water removal to a further extent results in a smaller particle size distribution, facilitating better the tuning of filter properties with the average particle size. It was even found that no filter aid is to be added to remove substantially all crystals.

Embodiments of processes according to the present invention may have several advantages.

Though not wishing to be bound by any particular theory, it is believed that the use of the polyprotic acid with highest pKa-value of the polyprotic acid being less than 3.5, optionally less than 3, has the advantage that after neutralization of the polyether polyol, all or all but one protons of each acid molecule are donated to neutralise the base catalyst. The addition of the polyprotic acid according to the present invention further removes propenyl unsaturation in the polyether polyol, such as alkylene ether end groups, which is a known smell precursor resulting in odorous acetal components in prepolymers and foams.

The remaining protons, having a pKa equal to the highest pKa-value of the polyprotic acid, are able to hydrolyse the alkylene ether end groups sufficiently and efficiently, resulting in a conversion into aldehyde contaminants, while these remaining protons can be present in such an amount that the acid value of the polyether polyol is kept within generally accepted ranges, which do not necessitate further neutralization with a base.

The aldehyde contaminants, such as typically propionaldehyde, can be removed from the polyol by means of conventional processes, e.g. by stripping.

In case of PO or combined EO/PO polyether polyols are provided, the propoxylation temperature may be in the range of 110 to 120° C., and the amount of catalyst may be in the range of about 0.18 to 0.28 w %.

As it is possible to reduce the presence of such alkylene ether end groups during the neutralization more efficiently, intensified propoxylation conditions may be used, e.g. the temperature during propoxylation may be in the range of 100 to 140° C., whereas 0.14 to 0.45 w % of base catalyst KOH may be used.

Hence the use of the polyprotic acid, in particular in the amounts as set out above, has the advantage that the polyether polyol can be brought to a condition slightly above neutral, i.e. slightly acid, however comprising such amounts of acid (or protons) that the polyether polyol falls within generally accepted specifications for acidity (also referred to acid value, expressed as mg KOH per gram polyol). The resulting polyether polyol may have an acidity value of less than 0.1, even less than 0.05 or less than 0.01 mg KOH/g. Hence additional neutralization with a base to meet the specifications is no longer required.

It was also noticed that the removal of the salt, formed by the base catalyst, typically KOH and the polyprotic acid, is made easier. It was noticed that the particle size distribution of the salt crystals is improved, i.e. more uniform particle dimensions, and optionally having a larger average size, which results in a more easy filtration and shorter filtration times.

Further, the amount of acid needed is smaller as compared to the known processes, which results in smaller amounts of salt crystals and a reduced waste streams may be obtained.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

Unless otherwise indicated, the term w % or % w refers to percentage by weight of a component, the percentage being relative to the total weight of the substance in which the component is present According to an embodiment of the present invention, 5245 g of alkaline F-428 intermediate was charged to a clean 10 liters polyether reactor and flushed twice with nitrogen.

Alkaline F-428 intermediate is a glycerol-started EO tipped PO polyether polyol with average molecular weight of 6000. The polyether polyol comprises 15.2% w of EO (on total of EO and PO).

The polyol was heated to 80° C. before the addition of 8.1 g pure sulphuric acid with 162 g water. The mixture was left stirring at 400 rpm (anchor) for 30 min and a 30 g sample was taken to check acid value. The acid value was measured 0.01 mg KOH/g which is below the target (between 0.05 and 0.1 mg KOH/g). Another 0.5 g of pure sulphuric acid and 100 g of water were added to the reactor and stirred for 30 min. After this the acid value was measured 0.09 mg KOH/g. The reactor content was then heated to 140° C. and dehydrated by vacuum distillation (approximately 10 mbar) to bring water content to less than 0.05 w % during 150 min. Another sample was taken of the unfiltered polyol to study the PSD of the crystals.

The rest of the batch was filtered over a preheated sintered candle filter.

In a comparative example, 5500 g of this alkaline F-428 intermediate was charged to a clean 10 liters polyether reactor and flushed twice with nitrogen. The polyol was then heated to 80° C. before the addition of 10 g pure adipic acid with 275 g water. The mixture was left stirring at 400 rpm (anchor) for 30 min and a 61 g sample was taken to check acid value. The acid value was measured −0.59 mg KOH/g, i.e. the product was still alkaline. Another 4.23 g of pure adipic acid was added to the reactor and stirred for 30 min. A new sample of 68 g was taken and the acid value was measured −0.15 mg KOH/g. A third addition of 1.85 g of pure adipic acid was done. After stirring 30 min the acid value was measured 0.08 mg KOH/g. The reactor content was then heated to 140° C. and dehydrated by vacuum distillation in an identical way as in the embodiment of the invention, during 150 min to provide a water content below 0.05% wt. Another sample was taken of the unfiltered polyol to study the PSD of the crystals.

The rest of the batch was filtered over a preheated sintered candle filter.

The results measured on the neutralised polyol of the embodiment of the invention and the comparative example are shown in table I.

TABLE I

|  | Acid: $H_2SO_4$ | Acid: adipic acid |
|---|---|---|
| Water content (% w) | <0.01 | <0.01 |
| K content (ppm) | 8 | 33 |
| Acid value (mgKOH/g) | 0.09 | 0.08 |
| Free propionaldehyde (ppm) | 1 | 115 |
| Bound propionaldehyde (ppm) | 6 | 860 |
| LMW(*) allyl (ppm) | 77 | 68 |
| LMW(*) propenyl (ppm) | 0 | 11 |
| Acid added (gram) | 8.6 | 16 |
| Mole acid added (mole) | 0.08776 | 0.11 |
| Mole $H^+$ added (mole) | 0.17551 | 0.22 |
| Mole $H^+$ needed for complete neutralization (mole) | 0.17 | 0.18 |
| Weight of neutralised polyol (kg) | 5,2536 | 5,516 |
| Excess of mole $H^+$ per kg neutralised polyol (mole/kg) | 0.00105 | 0.0054 |

(*)low molecular weight compounds, being compounds having a MW of less than 170 g/mol.

It is clear that, for the same acid value of the polyol, the use of a polyprotic acid with its highest pKa value less than 3.5, in the embodiment 1.99, has the effect that substantially all propenylether end groups were converted to propionaldehyde, which was removed during evacuation of water, whereas this conversion was not the case when polyprotic acid is used with a highest pKa more than 3.5, such as 5.41 for adipic acid.

From the above mentioned polyether polyols, an analysis of the salt crystals obtained by neutralization of the base catalyst (KOH) with sulphuric acid, respectively adipic acid, shows that in the process according to the embodiment, the particle size distribution is more uniform, hence more easy to filter. Particle size distribution (PSD) is shown in table II.

TABLE II

| PSD (vol %) | Acid: $H_2SO_4$ | Acid: adipic acid |
|---|---|---|
| <5 μm | 0.65 | 0.02 |
| 5 to 10 μm | 1.27 | 1.21 |
| 10 to 20 μm | 3.39 | 5.34 |
| 20 to 50 μm | 8.82 | 15.10 |
| 50 to 100 μm | 23.53 | 16.14 |
| 100 to 200 μm | 41.61 | 22.65 |
| 200 to 500 μm | 20.74 | 24.74 |
| 500 to 1000 μm | 0 | 14.82 |
| 1000 to 2000 μm | 0 | 0 |

A significantly less amount of fine particles, having a particle size of less than 50 μm, is obtained. These particles are, in general, more difficult to filter from the polyol liquid. The large particles (size more than 200 μm) often cause the filter to become fouled at the surface. The smaller amount of large particles when using sulphuric acid, cause the fouling of the filter medium to be postponed.

From the table III under, it becomes clear that water removal at elevated temperatures in the range of 100 to 160 deg C. results in faster water removal, and salt crystals with increased average particle size and smaller deviation.

The same intermediate F428 was neutralised with $H_2SO_4$ using an excess before dewatering of about 0.0015 mol H per kg polyol. Additional water (5% w based upon the weight of the unneutralised polyol) was added. The neutralised polyether polyol was dewatered at temperatures of 140 deg C., and for comparative examples at 65 deg C. the polyols were dewatered to comparative water contents as indicated in the table III. As it is clear from the particle size distribution, the crystals being removed have in case of dewatering at 140 deg C. an average particle size in the range of 100 to 200 µm, whereas dewatering at 65 deg C. (at slower rate) results in particles with average particle size of 10 to 20 µm, which are far more difficult to remove on industrial scale.

TABLE III

| experiment | 1 | 2 | 3 | 4 |
|---|---|---|---|---|
| F428 (gram) | 4640 | 4800 | 5030 | 5112 |
| $H_2SO_4$ pure - (gram) | 8 | 8.4 | 8.7 | 8.8 |
| Excess H+ mol/kg F428 | 0.00133 | 0.00161 | 0.00150 | 0.00144 |
| Added water (gram) | 240 | 240 | 260 | 253 |
| Added water (% over F428) | 5 | 5 | 5 | 5 |
| Av before dehydration (mg KOH/g polyol) | 0.07 | 0.08 | 0.08 | 0.10 |
| Pressure at start dewatering (bar absolute) | 3.3 | 3.65 | 1.04 | 1.06 |
| Pressure at end dewatering (bar absolute) | 0.32 | 0.64 | 0.05 | 0.07 |
| Temperature during dewatering (deg C.) | 140 | 140 | 65 | 65 |
| Dehydration time (h) | 1:07 | 0:51 | 2:55 | 3:40 |
| Water content after dehydration (% w over dehydrated polyol) | 0.3 | 0.5 | 0.4 | 0.6 |
| Content K (ppm) | 32 | 33 | 27 | 23 |
| Particle size (% volume) | | | | |
| <5 µm | 0.89 | 0.97 | 2.74 | 0.17 |
| 50-10 µm | 1.84 | 2.16 | 22.22 | 12.23 |
| 10-20 µm | 3.86 | 3.71 | 48.41 | 47.72 |
| 20-50 µm | 3.13 | 9.07 | 26.61 | 39.52 |
| 50-100 µm | 22.92 | 20.89 | 0.01 | 0.36 |
| 100-200 µm | 45.11 | 35.47 | 0 | 0 |
| 200-500 µm | 15.98 | 24.67 | 0 | 0 |
| 500-1000 µm | 2.07 | 1.68 | 0 | 0 |
| 1000-2000 µm | 4.20 | 1.40 | 0 | 0 |

It is to be understood that although preferred embodiments and/or materials have been discussed for providing embodiments according to the present invention, various modifications or changes may be made without departing from the scope and spirit of this invention.

The invention claimed is:

1. A process for neutralizing an unneutralised polyether polyol prepared using a base catalyst, the process comprising the steps of
    addition of a polyprotic acid to the unneutralised polyether polyol, the highest pKa-value of the polyprotic acid being less than 3.5, wherein, per kilogram of unneutralised polyether polyol, "A" moles of said polyprotic acid are added to the unneutralised polyether polyol, such that (n−1)*A<B<n*A, wherein B is the moles of protons necessary to completely neutralize a kilogram of unneutralised polyether polyol;
    n is the number of protons which said polyprotic acid can donate;
    removing water from said neutralised polyether polyol at a temperature between 100 deg C. and 160 deg C., providing dewatered neutralised polyether polyol with a water content of less than 1% w based upon the weight of the dewatered neutralised polyether polyol; and
    removing the crystals formed during the steps of addition of acid and removal of water from the neutralised polyether polyol.

2. The process for neutralizing an unneutralised polyether polyol according to claim 1, wherein the amount of polyprotic acid added to the unneutralised polyether polyol provided is such that after complete neutralization, an excess of less than 0.0018 mole of protons ($H^+$) per kilogram neutralised polyol is provided.

3. The process for neutralizing an unneutralised polyether polyol according to claim 1, wherein said polyprotic acid is $H_2SO_4$.

4. The process for neutralizing an unneutralised polyether polyol according to claim 1, wherein removing water from said neutralised polyether polyol is done at a temperature between 110 deg C. and 145 deg C.

5. The process for neutralizing an unneutralised polyether polyol according to claim 1, wherein removing water from said neutralised polyether polyol provides dewatered neutralised polyether polyol with a water content of less than 0.5% w based upon the weight of the dewatered neutralised polyether polyol.

6. The process for neutralizing an unneutralised polyether polyol according to claim 1, wherein removing water from said neutralised polyether polyol provides dewatered neutralised polyether polyol with a water content of less than 0.1% w based upon the weight of the dewatered neutralised polyether polyol.

7. The process for neutralizing an unneutralised polyether polyol according to claim 1, wherein removing the crystals formed during the steps of addition of acid and removal of water from the neutralised polyether polyol is done by filtration.

8. The process for neutralizing an unneutralised polyether polyol according to claim 1, wherein removing the crystals formed during the steps of addition of acid and removal of water from the neutralised polyether polyol is done by centrifugation.

9. The process of claim 1, wherein the unneutralised polyether polyol is prepared from a reaction mixture having catalyst content of 0.14 w % to 0.45 w %.

10. The process of claim 9, wherein the unneutralised polyether polyol is prepared at a temperature between about 100° C. and about 140° C.

11. The process of claim 10, further comprising diluting the polyprotic acid prior to addition of the polyprotic acid to the unneutralised polyether polyol.

12. The process of claim 2, wherein said polyprotic acid is $H_2SO_4$.

13. The process of claim 2, wherein removing water from said neutralised polyether polyol is done at a temperature between 110 deg C. and 145 deg C.

14. The process of claim 2, wherein removing water from said neutralised polyether polyol provides dewatered neutralised polyether polyol with a water content of less than 0.5% w based upon the weight of the dewatered neutralised polyether polyol.

15. The process of claim 2, wherein removing water from said neutralised polyether polyol provides dewatered neutralised polyether polyol with a water content of less than 0.1% w based upon the weight of the dewatered neutralised polyether polyol.

16. The process of claim 2, wherein removing the crystals formed during the steps of addition of acid and removal of water from the neutralised polyether polyol is done by filtration.

17. The process of claim 2, wherein removing the crystals formed during the steps of addition of acid and removal of water from the neutralised polyether polyol is done by centrifugation.

18. The process of claim 2, wherein the unneutralised polyether polyol is prepared from a reaction mixture having catalyst content of 0.14 w % to 0.45 w %.

19. The process of claim 18, wherein the unneutralised polyether polyol is prepared at a temperature between about 100° C. and about 140° C.

20. The process of claim 19, further comprising diluting the polyprotic acid prior to addition of the polyprotic acid to the unneutralised polyether polyol.

* * * * *